(12) United States Patent
Chu et al.

(10) Patent No.: US 11,397,479 B2
(45) Date of Patent: Jul. 26, 2022

(54) DIGITAL PEN INCLUDING STEPPED STRUCTURE AND ELECTRONIC DEVICE INCLUDING SAME

(71) Applicant: Samsung Electronics Co., Ltd., Suwon-si (KR)

(72) Inventors: Nayoung Chu, Suwon-si (KR); Yongwoon Kim, Suwon-si (KR); Yongjoo Shin, Suwon-si (KR); Jinwan An, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/266,804

(22) PCT Filed: Oct. 2, 2019

(86) PCT No.: PCT/KR2019/012903
§ 371 (c)(1),
(2) Date: Feb. 8, 2021

(87) PCT Pub. No.: WO2020/071781
PCT Pub. Date: Apr. 9, 2020

(65) Prior Publication Data
US 2021/0342023 A1 Nov. 4, 2021

(30) Foreign Application Priority Data
Oct. 4, 2018 (KR) .................. 10-2018-0118094

(51) Int. Cl.
*G06F 3/0354* (2013.01)
*H02J 50/10* (2016.01)
(Continued)

(52) U.S. Cl.
CPC .......... *G06F 3/03545* (2013.01); *G06F 3/038* (2013.01); *G06F 3/04162* (2019.05);
(Continued)

(58) Field of Classification Search
CPC .. G06F 3/03545; G06F 3/04162; G06F 3/038; G06F 3/0441; G06F 2203/0384; H02J 50/10; H01Q 1/273
See application file for complete search history.

(56) References Cited

U.S. PATENT DOCUMENTS 8,248,389 B2 8/2012 Raif et al.
2012/0268429 A1 10/2012 Lee et al.
(Continued)

FOREIGN PATENT DOCUMENTS

KR 10-2009-0129148 A 12/2009
KR 10-2012-0119610 A 10/2012
(Continued)

*Primary Examiner* — Lisa S Landis
(74) *Attorney, Agent, or Firm* — Jefferson IP Law, LLP

(57) ABSTRACT

An electronic device according to various embodiments comprises: a housing, extended to be long, including a first end part having an opening of a first diameter and a second end part having an opening of a second diameter that is larger than the first diameter; a first internal structure which includes a third end part located between the first end part and the second end part and a fourth end part located between the third end part and the second end part, and which is arranged in a first space of the housing between the first end part and the second end part; a pen tip part which includes a dielectric tip extending outwardly from the inside of the housing through the first end part, and which is mounted on the third end part of the first internal structure; a printed circuit board mounted on the first internal structure between the third end part and the fourth end part; a second internal structure which includes a fifth end part engaged with the fourth end part and a sixth end part exposed to the outside of the housing, and which is arranged in a second space of the housing between the second end part and the first space; and a pressure structure partially exposed to the outside of the housing and engaged with the second internal structure through the sixth end part. Other additional embodiments are possible.

18 Claims, 11 Drawing Sheets

(51) Int. Cl.
  *G06F 3/041*  (2006.01)
  *G06F 3/038*  (2013.01)
  *H01Q 1/27*  (2006.01)
  *G06F 3/044*  (2006.01)

(52) U.S. Cl.
  CPC ............ *H01Q 1/273* (2013.01); *H02J 50/10* (2016.02); *G06F 3/0441* (2019.05); *G06F 2203/0384* (2013.01)

(56) References Cited

U.S. PATENT DOCUMENTS

2013/0329335 A1* 12/2013 Obata .................... H01G 5/011
                                                            361/278
2014/0118311 A1   5/2014  Yeh et al.
2017/0083121 A1   3/2017  Kang et al.
2017/0285775 A1  10/2017  Park et al.
2018/0217687 A1*  8/2018  Yoo .................... G06F 3/03545

FOREIGN PATENT DOCUMENTS

| KR | 10-2015-0106494 A | 9/2015 |
| KR | 10-2016-0029371 A | 3/2016 |
| KR | 10-2017-0033633 A | 3/2017 |
| KR | 10-2017-0112566 A | 10/2017 |

\* cited by examiner

DIGITAL PEN INCLUDING STEPPED STRUCTURE AND ELECTRONIC DEVICE INCLUDING SAME

TECHNICAL FIELD

Various embodiments of the disclosure relate to a digital pen, which is separable from an electronic device and is used for a user input, and an electronic device including the same.

BACKGROUND ART

Recently, with the development of digital technology, various types of electronic devices (e.g., display devices), such as mobile communication terminal, smart phone, tablet personal computer (PC), laptop, personal digital assistant (PDA), wearable device, and digital camera, have been widely used.

An electronic device is provided with a digital pen, such as a stylus pen, which can receive a user input through a touchscreen display and recognize the user input more precisely. For example, the digital pen may be mounted in an inner space of the electronic device, and may be provided in a detachable form in the electronic device.

DISCLOSURE OF INVENTION

Technical Problem

A digital pen may include a stylus pen configuration providing a user input function and an ejection configuration being detachable from an electronic device, and may include a joint configuration to join the both configurations together. However, in case that the digital pen is combined by the joint configuration, there is a possibility that the stylus pen configuration and the ejection configuration are easily disassembled by external impacts.

Further, in accordance with user demands for various functions of the electronic device, it is necessary for various kinds of constituent elements to be additionally mounted inside the digital pen, but in consideration of the sizes of the electronic device and the digital pen, there may be restrictions in space for mounting the constituent elements.

Various embodiments of the disclosure provide a digital pen provided with a disposal space for additional constituent elements through an assembly structure and shape of the digital pen, having an improved durability, and supporting various functions, and an electronic device including the same.

Solution to Problem

An electronic device according to various embodiments may include: an elongated housing including a first end part having an opening of a first diameter and a second end part having an opening of a second diameter being larger than the first diameter; a first internal structure including a third end part located between the first end part and the second end part and a fourth end part located between the third end part and the second end part and disposed in a first space of the housing between the first end part and the second end part; a pen tip part including a dielectric tip extending outwardly from an inside of the housing through the first end part and mounted on the third end part of the first internal structure; a printed circuit board mounted on the first internal structure between the third end part and the fourth end part; a second internal structure including a fifth end part engaged with the fourth end part and a sixth end part exposed to an outside of the housing and disposed in a second space of the housing between the second end part and the first space; and a pressurized structure partially exposed to the outside of the housing and interlinked with the second internal structure through the sixth end part.

An electronic device according to various embodiments may include: a digital pen including an elongated housing including a first end part having an opening of a first diameter and a second end part having an opening of a second diameter being larger than the first diameter, a first internal structure including a third end part located between the first end part and the second end part and a fourth end part located between the third end part and the second end part and disposed in a first space of the housing between the first end part and the second end part, a dielectric tip extending outwardly from an inside of the housing through the first end part and mounted on the third end part of the first internal structure, a printed circuit board mounted on the first internal structure between the third end part and the fourth end part, a second internal structure including a fifth end part engaged with the fourth end part and a sixth end part exposed to an outside of the housing and disposed in a second space of the housing between the second end part and the first end part, and a pressurized structure partially exposed to the outside of the housing and interlinked with the second internal structure through the sixth end part; a touchscreen display; a recess into which the digital pen can be inserted; and a processor, wherein the digital pen is configured to output a resonance frequency signal in accordance with a user input, and the processor is configured to identify a kind of user input based on an output signal from the digital pen.

Advantageous Effects of Invention

Since the digital pen according to the various embodiments can be configured so that the internal constituent elements are integrally combined with each other and then are inserted into the housing, durability of the digital pen can be improved, and it is possible to provide a space for additionally disposing therein an antenna and/or battery constituent elements inside the digital pen.

Further, the digital pen according to the various embodiments can be configured so that the internal constituent elements are disposed in designated locations of the housing through design of the shapes and/or the sizes of the internal constituent elements and the housing.

Since the digital pen according to the various embodiments includes an antenna and/or a battery through the space provided as described above, it can support wireless communication and wireless charging functions.

MODE FOR THE INVENTION

Figure 1:
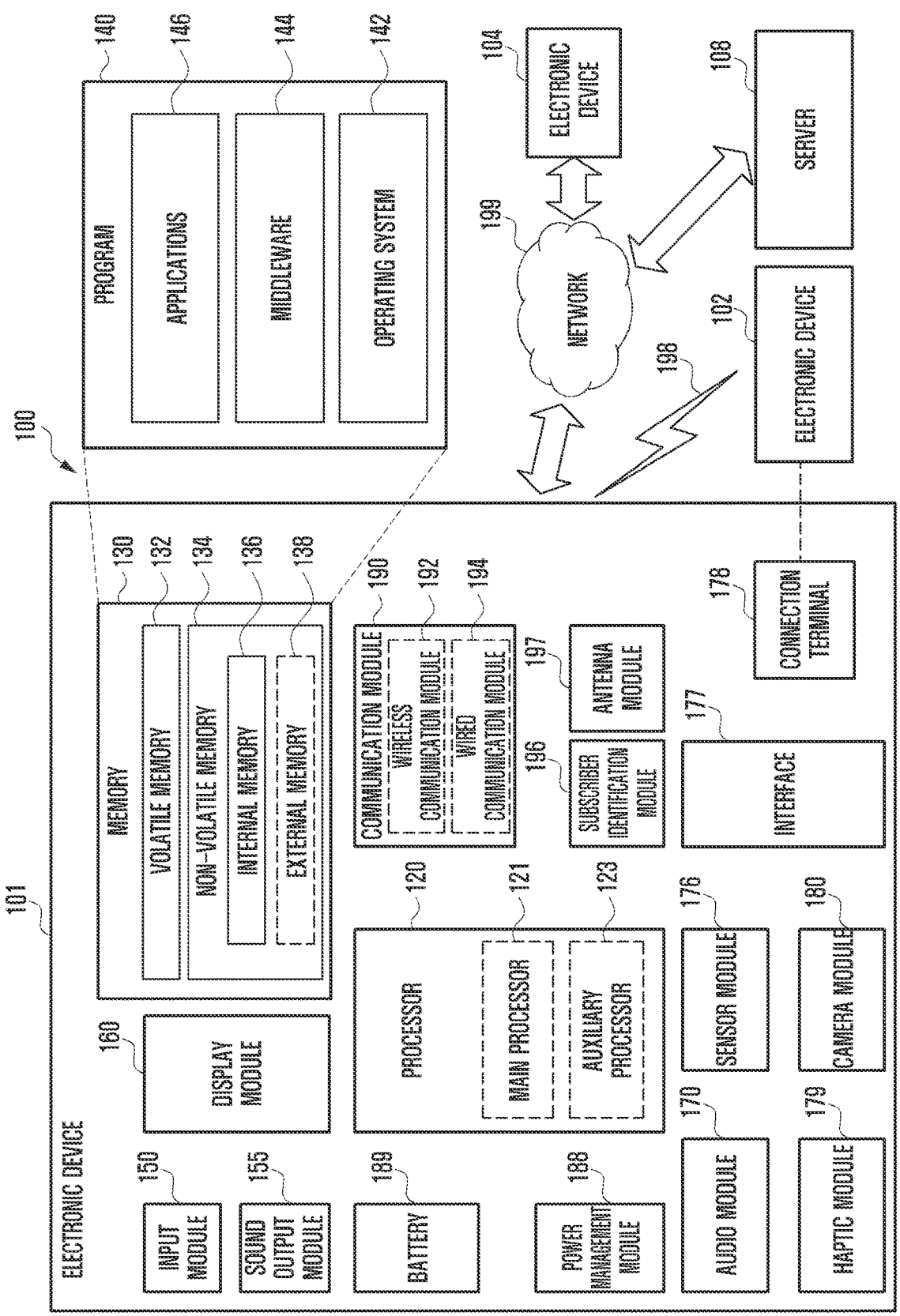
FIG. 1 is a block diagram of an electronic device 101 in a network environment 100 according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
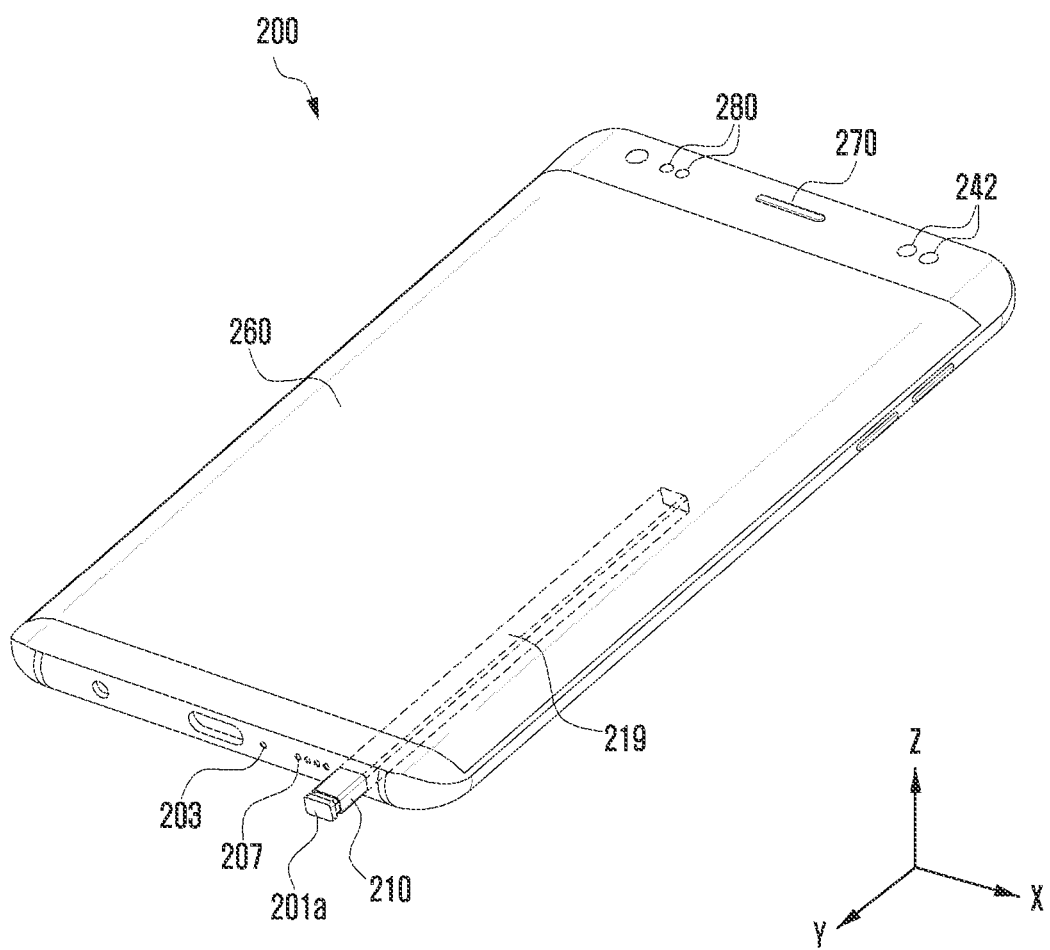
FIG. 2 is a view illustrating a first electronic device including a second electronic device (e.g., digital pen) according to various embodiments of the disclosure.

FIG. 2 is a view illustrating a first electronic device including a second electronic device (e.g., digital pen) according to various embodiments.

A first electronic device 200 (e.g., electronic device 101 of FIG. 1) according to various embodiments is not limited to the shape of FIG. 2, and various embodiments of the disclosure may be applied to various kinds of electronic devices (e.g., portable multimedia device, portable medical device, camera, wearable device, and the like) including a second electronic device 210.

Referring to FIG. 2, the first electronic device 200 according to various embodiments may include a display 260 (e.g., display device 160 of FIG. 1) in front.

For example, the display 260 may be a touchscreen display, and may include a touch sensor on the rear of the display 260, or may include an integral touch sensor inside the display 260. According to an embodiment, the display 260 may include a digitizer configured to sense the second electronic device 210 or to process a signal received from the second electronic device 210.

According to an embodiment, the first electronic device 200 may include at least one of a sound output device (e.g., speaker 207 and/or receiver 270) (e.g., sound output device 155 of FIG. 1), at least one microphone 203, at least one sensor 280 (e.g., sensor module 176 of FIG. 1), or a camera 242 (e.g., camera module 180 of FIG. 1) in an area (e.g., black matrix (MB) area) excluding an area in which the front display 260 is disposed.

For example, the first electronic device 200 may include at least one microphone 203. The microphone 203 may collect external sound information. For example, the microphone 203 may be disposed in at least one location of an upper end part or a lower end part on the front of the first electronic device 200, and is not limited to the number, the shape, and/or the disposal location of the microphones 203 illustrated in FIG. 2. According to various embodiments, the first electronic device 200 may provide various handset solutions and/or audio solutions based on sound data acquired through the microphone 203.

According to various embodiments, the sound output device 207 or 270 (e.g., sound output device 155 of FIG. 1) may be disposed to be exposed to an outside through a speaker hole (or call receiver hole), or may be mounted on the first electronic device 200 in the form having no speaker hole (e.g., piezo speaker).

According to various embodiments, the at least one sensor 280 (e.g., sensor module 176 of FIG. 1) may include at least one of a camera module, an illumination sensor, and a proximity sensor. The sensor 280 may generate an electric signal (or data value) corresponding to an internal operation situation of the first electronic device 200 or an external environment. The at least one sensor 280 may be disposed at an upper end of the housing, but the disposal of the sensor 280 is not limited thereto.

As illustrated in FIG. 2, the first electronic device 200 according to various embodiments may include the second electronic device 210 (e.g., digital pen). For example, the second electronic device 210 may be used as an input tool for the display 260 of the first electronic device 200.

The first electronic device 200 may include a recess (or pen pocket) 219 which is provided in at least a partial area of the first electronic device 200 and into which the second electronic device 210 may be inserted. For example, the recess 219 may be formed in an elongated structure corresponding to the size and the shape of the second electronic device 210 so that the second electronic device 210 can be inserted into or separated from the recess.

According to an embodiment, the second electronic device 210 may include a push button part 210a provided at one end part thereof so as to easily take out the second electronic device 210 from the recess 219 of the first electronic device 200. For example, when the button part 210a of the second electronic device 210 is pushed, a repulsion mechanism (e.g., spring) configured in association with the button part 210a operates to make the second electronic device 210 secede from the recess 219.

According to an embodiment, an inlet of the recess 219 may be located at a lower end part of the first electronic device 200, but is not limited thereto, and may be configured so that the second electronic device 210 can be inserted into the inside of the first electronic device 200 through at least one of an upper side, a side, and a lower side of the first electronic device 200.

According to various embodiments, the first electronic device 200 may further include a processor (e.g., processor 120 of FIG. 1). The processor (not illustrated) may recognize a touch (or hovering) input on the display 260. For example, the processor (not illustrated) may recognize a touch input, a hovering input, or a button (e.g., side button) input being performed by the second electronic device 210, and in particular, the processor may identify input information (e.g., touch or hovering location information by the second electronic device 210, touch pressurization information, and/or button input information) through reception of a resonance frequency signal output from the second electronic device 210. For example, the second electronic device 210 may output different resonance frequency signals based on the degree of touch pressurization and/or whether to push the side button. The processor (not illustrated) may provide various user interfaces to a user based on the output signal from the second electronic device 210.

Figure 3A:
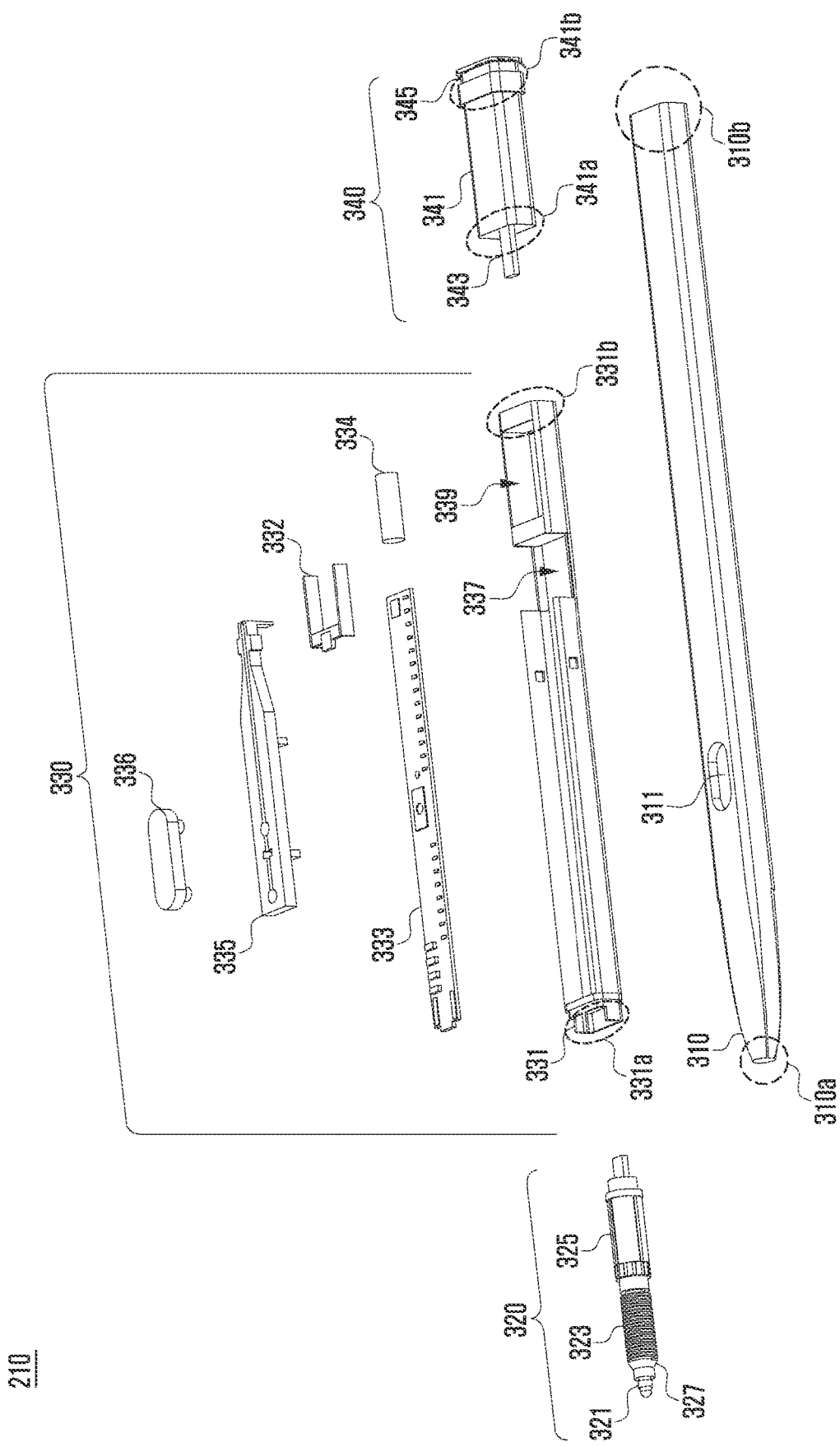
FIG. 3A is an exploded view explaining the structure of a second electronic device according to various embodiments of the disclosure.
Figure 3B:
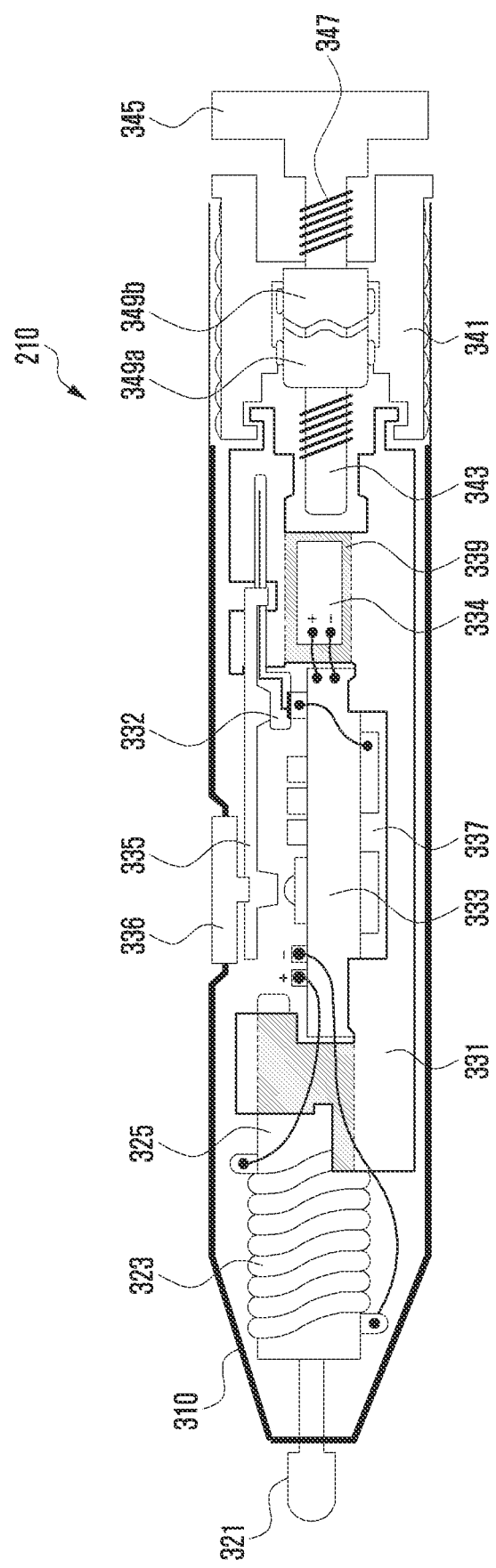
FIG. 3B is a cutaway cross-sectional view of the second electronic device of FIG. 3A according to various embodiments of the disclosure.

FIG. 3A is an exploded view explaining the structure of a second electronic device 210 according to various embodiments of the disclosure, and FIG. 3B is a cutaway cross-sectional view of the second electronic device 210.

Referring to FIGS. 3A and 3B, the second electronic device 210 according to various embodiments may include a housing 310 configuring the appearance of the second electronic device 210 and inner assemblies 320, 330, and 340 being inserted into and combined with the housing 310. For example, the inner assemblies 320, 330, and 340 may be integrally retractable into an inside of the housing 310.

According to various embodiments, the housing 310 may be formed in an elongated elliptical pillar shape having both open ends (first end part 310a and second end part 310b), and the inner assemblies (e.g., a pen tip part 320, a circuit board part 330, and an ejection member 340) of the second electronic device 210 may be mounted in an inner space between the both ends 310a and 310b.

For example, the housing 310 may include an opening of a first diameter at the first end part 310a and may include an opening of a second diameter at the second end part 310b directed in an opposite direction to the first end part 310a. The housing 310 may be formed in a shape in which the width is widened as going from the first end part 310a to the second end part 310b. For example, the diameter (second diameter) of the opening of the second end part 310b may be larger than the diameter (first diameter) of the opening of the first end part 310a.

The openings of the first end part 310a and the second end part 310b according to various embodiments may be in a circular shape, but are not limited thereto, and may have various shapes, such as oval, hexagon, octagon, and the like. In case that the openings of the first end part 310a and the second end part 310b have the shapes excluding the circle, the area of the opening of the second end part 310b may be larger than the area of the opening of the first end part 310a.

The housing 310, for example, at least a partial area of the housing may be formed of a synthetic resin (e.g., plastic) material or a metal (e.g., aluminum) material. According to an embodiment, in the housing 310, at least a part of an area corresponding to the ejection member 340 may be formed of a metal material, and the remaining area may be formed of a synthetic resin material. According to another embodiment, the housing 310 may be formed of a synthetic resin material as a whole, or may be formed of a metal material.

According to an embodiment, the housing 310 may include a side hole 311 provided on one side corresponding to a side button 336. For example, a user may control the output signal by the second electronic device 210 by pressing or non-pressing the side button 336 exposed to an outside through the side hole 311.

An inner assembly according to various embodiments may include the pen tip part 320, the circuit board part 330, and the ejection member 340. The pen tip part 320, the circuit board part 330, and the ejection member 340 may be mounted in the housing 310 in an integrally assembled state.

The pen tip part 320 according to various embodiments may be disposed in a location corresponding to the first end part 310a of the housing 310. For example, the pen tip part 320 may extend from the inside of the housing to the outside through the opening of the first end part 310a, and at least a part of the pen tip part 320 may be exposed to the outside.

According to various embodiments, the pen tip part 320 may include a pen tip 321, a coil 323, and a pen pressure sensor 325.

The pen tip 321 may be composed of a dielectric tip, and may be disposed to extend from the inside of the housing 310 to the outside through the first end part 310a. For example, the pen tip 321 may come in contact with (or come close to) the display 260 of the first electronic device 200 by the user, and the second electronic device 210 may provide signal information generated based on whether to contact (or approach) the pen tip 321 and the degree of pressurization to the first electronic device 200.

The coil 323 may include a coil wound in plural turns, and the second electronic device 210 may generate a specific resonance frequency signal through the coil. For example, the coil 323 may adjust the resonance frequency signal through at least one capacitor on a PCB 333 electrically connected to the coil 323, and may output a different resonance frequency signal to the outside depending on whether to push the side button 336 provided on one side of the second electronic device 210.

The pen pressure sensor 325 may change the size of capacitance of the pen tip part 320 in accordance with the degree of pressurization of the pen tip 321. For example, the pen pressure sensor 325 may adjust the resonance frequency signal generated in accordance with the change of the capacitance size.

The pen tip part 320 may further include a packing ring 327 to prevent an inflow of dust or moisture through the opening of the first end part 310a. For example, the packing ring 327 may be made of at least one of epoxy, rubber, urethane, and/or silicone.

The circuit board part 330 according to various embodiments may include circuit accessories 333, 332, 334, 335, and 336 and a first internal structure 331 for mounting the circuit accessories thereon.

According to various embodiments, the first internal structure 331 may be disposed in a space between the first end part 310a and the second end part 310b of the housing. For example, one end (third end part 331a) of the first internal structure 331 may be combined with the pen tip part 320, and the other end thereof (fourth end part 331b) may be combined with the ejection member 340. The first internal structure 331 may include a plurality of storage spaces (e.g., PCB container 337, battery container 339, antenna container (not illustrated), and the like) in which the circuit accessories can be disposed.

For example, the circuit accessories mounted on the first internal structure 331 may include at least one of the PCB 333, antenna 332, battery 334, support member 335, and side button 336.

The PCB 333 may include circuit configurations used for an electrical driving of the second electronic device 210. For example, the second electronic device 210 may output the specific resonance frequency signal in accordance with the degree of pressurization of the pen tip 321 using the PCB 333 electrically connected to the pen tip part 320. As another example, if pressurization on a dome key of the PCB 333 occurs through the side button 336 and the support member 335, the second electronic device 210 may differently output the resonance frequency signal. The side button 336 may be exposed to the outside through, for example, the side hole 311 provided on the housing 310.

The PCB 333 may be disposed on the PCB container 337 of the first internal structure 331, and the first internal structure 331 may support the PCB 333, and may protect the PCB 333 against external impacts.

The antenna 332 and the battery 334 may support a wireless communication (e.g., BLE communication) function of the second electronic device 210. For example, the antenna 332 may be electrically connected to a wireless communication interface of the PCB 333, and using the antenna 332 and the wireless communication interface, the second electronic device 210 may perform wireless communication with the external device (e.g., first electronic device 200). For example, the antenna 332 may be disposed in an area close to the ejection member 340 in the first internal structure 331.

According to various embodiments, the antenna of the second electronic device 210 may include the antenna 332 as exemplarily illustrated in FIG. 3A and/or an antenna embedded on the PCB 333. Further, instead of being disposed in the container of the first internal structure 331, the antenna 332 may be disposed in another location inside the housing 310.

The battery 334 may include, for example, a lithium-ion battery or a capacitor, and may be rechargeable or interchangeable. According to an embodiment, the battery 334 may be charged using a power (e.g., direct current signal (direct current power)) being provided through an induced current formed by the pen tip part 320.

As an embodiment, although FIG. 3B illustrates that the battery container 339 is included in the first internal structure 331 and a separate battery 334 (e.g., cylinder type battery) is disposed in the battery container 339, the second electronic device 210 may include a battery (e.g., electric dual layer capacitor (EDLC) mounted on the PCB 333, but other circuit accessories (e.g., antenna, microphone, and the like) may be mounted in the location of the battery container 339 instead.

The ejection member 340 according to various embodiments may be disposed in the location corresponding to the second end part 310b of the housing 310.

The ejection member 340 according to various embodiments may include a second internal structure 341 disposed inside the housing 310, a shaft 343 surrounded by the second internal structure 341 and being rotatable in a direction in which it gets away from or gets closer to the circuit board part 330, a button part 345 providing click feeling to a user, a CAM lower 349a and a CAM upper 349b connected in a saw toothed structure and pushing the button part 345 outwardly in accordance with pressing of the button part 345, and/or at least one spring part 347.

For example, the second internal structure 341 of the ejection member 340 may have one end (fifth end part 341a) engaged with one end (fourth end part 331b) of the circuit board part 330 (e.g., first internal structure 331 of the circuit board part 330) and the other end (sixth end part 341b) being at least partly exposed to the outside through the opening of the second end part 310b of the housing 310.

The ejection member 340 may be a configuration to detach the second electronic device 210 inserted into the recess 219 (or pen pocket) of the first electronic device 200. For example, the button part 345 may project outwardly so that the second electronic device 210 in a state where it is inserted into the first electronic device 200 can be detached from the first electronic device 200 when the user presses the button part 345 of the ejection member 340.

According to various embodiments of the disclosure, the second internal structure 341 may be formed with a width being relatively wider than the width of the first internal structure 331 of the circuit board part 330 so that respective constituent elements of the inner assembly can be disposed in a designated space when the inner assembly is inserted into the housing 310.

For example, in the inner space of the housing 310, the width of a first space of the housing 310 in which the first internal structure 331 is disposed may be configured to be narrower than the width of a second space of the housing 310 in which the second internal structure 341 of the ejection member 340 is disposed. In other words, the inner height of the first space of the housing 310 may be formed to be lower than the inner height of the second space.

According to various embodiments, when the inner assembly is integrally inserted into the housing 310, the second internal structure 341 may be disposed in the second space of the housing 310 and the first internal structure 331 may be disposed in the first space of the housing 310, due to a width difference between the first space and the second space of the housing 310 and a width difference between the first internal structure 331 and the second internal structure 341.

According to various embodiments of the disclosure, the second electronic device (e.g., digital pen) 210 may include: an elongated housing 310 including a first end part 310a having an opening of a first diameter and a second end part 310b having an opening of a second diameter being larger than the first diameter; a first internal structure 331 including a third end part 331a located between the first end part 310a and the second end part 310b and a fourth end part 331b located between the third end part 331a and the second end part 310b and disposed in a first space of the housing 310 between the first end part 310a and the second end part 310b; a pen tip part 320 including a dielectric tip 321 extending outwardly from an inside of the housing 310 through the first end part 310a and mounted on the third end part 331a of the first internal structure 331; a printed circuit board 333 mounted on the first internal structure 331 between the third end part 331a and the fourth end part 331b; a second internal structure 341 including a fifth end part 341a engaged with the fourth end part 331b and a sixth end part 341b exposed to an outside of the housing 310 and disposed in a second space of the housing 310 between the second end part 310b and the first space; and a pressurized structure 345 partially exposed to the outside of the housing 310 and interlinked with the second internal structure 341 through the sixth end part 341b.

According to various embodiments, the second internal structure 341 of the second electronic device 210 may be formed with a shape and/or a size with which the second internal structure 341 is not inserted into the first space.

According to various embodiments, the second electronic device 210 may further include a coil 323 wound on the dielectric tip 321, and the coil may be electrically connected to the printed circuit board 333.

According to various embodiments, the second electronic device 210 may further include a battery 334 disposed on the first internal structure 331 and a charging circuitry, and the charging circuitry may be configured to provide charges induced by the coil to the battery.

According to various embodiments, at least a part of the second internal structure 341 of the second electronic device 210 may be formed with a shape and/or a size with which the second internal structure 341 is not inserted into the inside of the housing 310.

According to various embodiments, the second electronic device 210 may further include an antenna 332 disposed on the first internal structure 331 and a wireless communication interface electrically connected to the antenna, and the second electronic device 210 may be configured to communicate with an external device using the antenna and the wireless communication interface.

According to various embodiments, the first internal structure 331 of the second electronic device 210 may include a space in which an antenna and/or a battery are able to be disposed.

According to various embodiments, in the second electronic device 210, the pen tip part 320 electrically connected to the printed circuit board may differently output a resonance frequency signal based on the degree of pressurization of the dielectric tip. Further, the second electronic device 210 may further include a side button provided on one side of the housing, and may differently output the resonance frequency signal based on whether to push the side button.

According to various embodiments, the first electronic device 200 may include: a digital pen 210 including an elongated housing including a first end part having an opening of a first diameter and a second end part having an opening of a second diameter being larger than the first diameter, a first internal structure including a third end part located between the first end part and the second end part and a fourth end part located between the third end part and the second end part and disposed in a first space of the housing between the first end part and the second end part, a pen tip part including a dielectric tip extending outwardly from an inside of the housing through the first end part and mounted on the third end part of the first internal structure, a printed circuit board mounted on the first internal structure between the third end part and the fourth end part, a second internal structure including a fifth end part engaged with the fourth end part and a sixth end part exposed to an outside of the housing and disposed in a second space of the housing between the second end part and the first space, and a pressurized structure partially exposed to the outside of the housing and interlinked with the second internal structure through the sixth end part; a touchscreen display; a recess into which the digital pen can be inserted; and a processor, wherein the digital pen 210 may be configured to output a resonance frequency signal in accordance with a user input, and the processor may be configured to identify a kind of user input based on an output signal from the digital pen.

According to various embodiments, the digital pen may further include an antenna disposed on the first internal structure and a wireless communication interface electrically connected to the antenna and mounted on the printed circuit board, wherein the digital pen may be configured to communicate with the processor and/or an external device using the antenna and the wireless communication interface.

For example, the second internal structure may be formed with a shape and/or a size with which the second internal structure is not inserted into the first space of the housing.

For example, the digital pen may further include a coil wound on the dielectric tip, and the coil may be electrically connected to the printed circuit board.

For example, the digital pen may further include a battery disposed on the first internal structure and electrically connected to the printed circuit board.

For example, the digital pen may further include a coil wound on the dielectric tip and a charging circuitry, and the charging circuitry may be configured to provide charges induced by the coil to the battery.

For example, in the digital pen, the first internal structure, the dielectric tip, the printed circuit board, the second internal structure, and the pressurized structure may be integrally connected to one another, and may be inserted into and combined with the inside of the housing.

For example, at least a part of the second internal structure of the digital pen may be formed with a shape and/or a size with which the second internal structure is not inserted into the inside of the housing.

For example, the first internal structure of the digital pen may include a space in which an antenna and/or a battery can be disposed.

For example, the digital pen may further include a side button provided on one side of the housing, and may differently output a resonance frequency signal based on whether to push the side button.

FIGS. 4A to 4G are views explaining the structure and an assembling method of a second electronic device 210 according various embodiments of the disclosure.

The second electronic device 210 according to various embodiments may include an inner assembly that can be integrally mounted in the housing 310. The inner assembly may be briefly composed of a structure in which the pen tip part 320, the circuit board part 330, and the ejection member 340 are combined with one another.

Figure 4A:
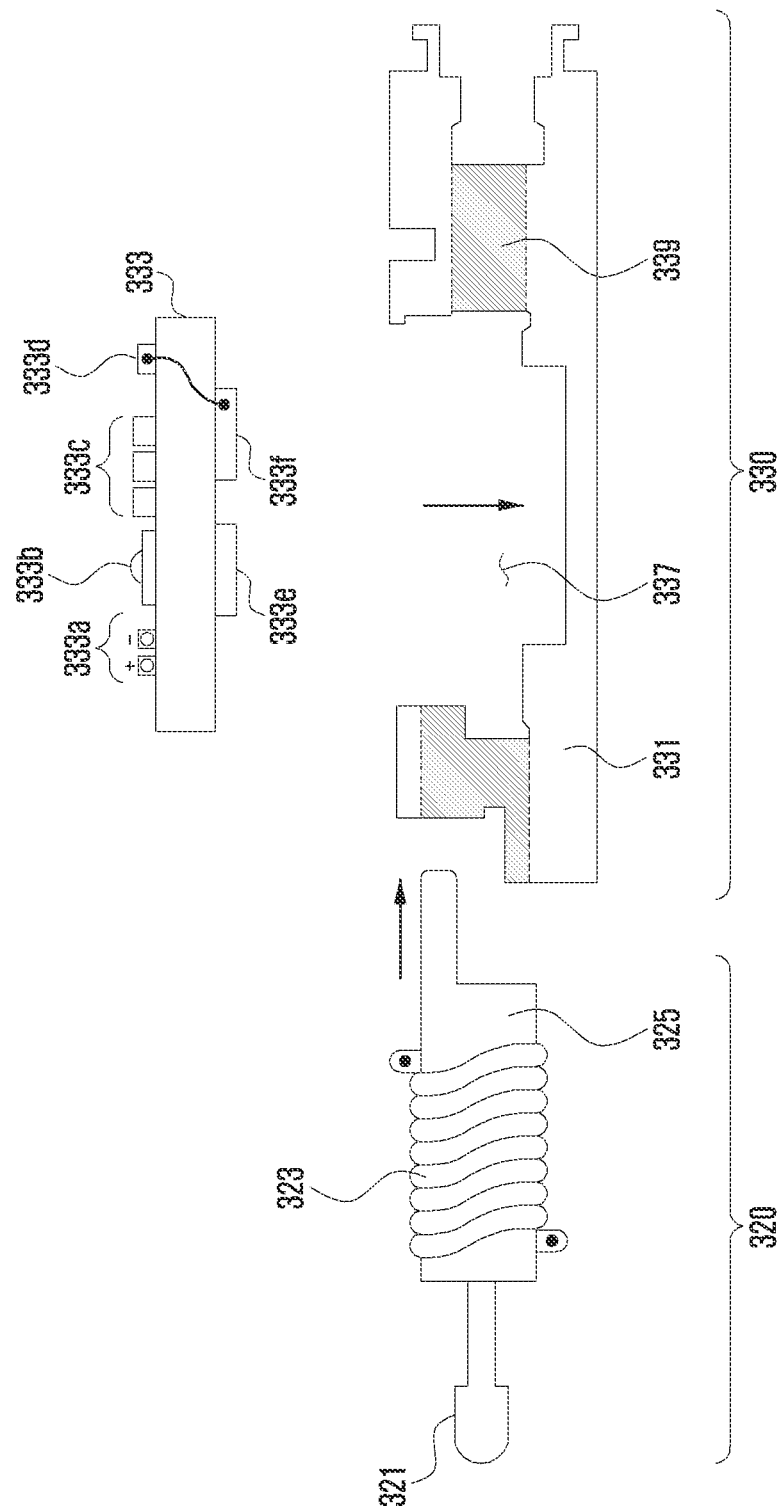
FIGS. 4A to 4G are views explaining the structure and an assembling method of a second electronic device according to various embodiments of the disclosure.
Figure 4B:
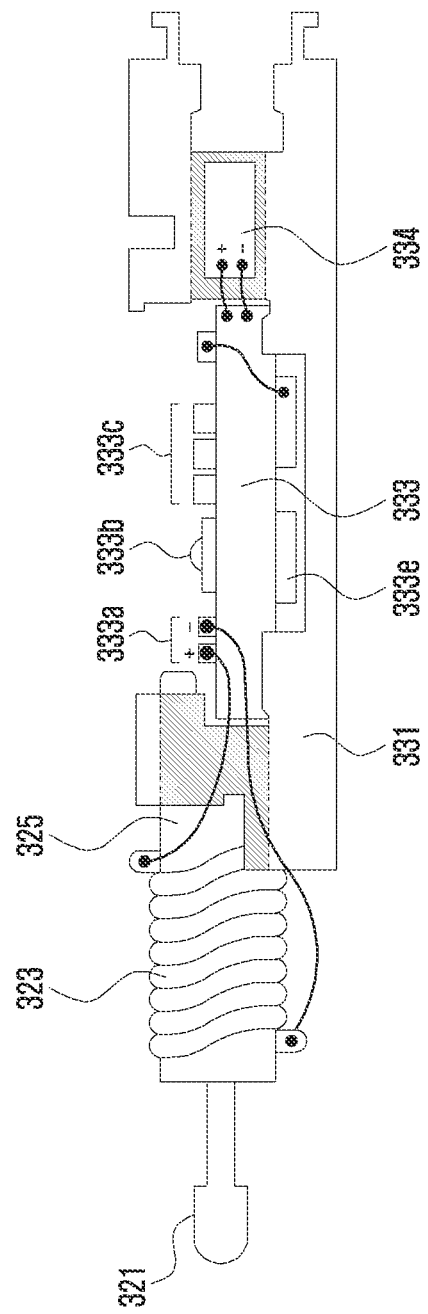

Referring to FIGS. 4A and 4B, the second electronic device 210 according to various embodiments may be assembled in order through disposing at least one circuit accessory including the PCB 333 on the first internal structure 331 of the circuit board part 330 and combining one end of the first internal structure 331 on which the at least one circuit accessory is disposed with one end of the pen tip part 320.

The first internal structure 331 of the circuit board part 330 may include a plurality of storage spaces, and circuit accessories may be stored in the plurality of storage spaces.

For example, the first internal structure 331 may include at least one of the PCB container 337 in which the PCB 333 can be disposed, the battery container 339 in which the battery 334 can be disposed, and the antenna container (not illustrated) in which the antenna (not illustrated) can be disposed. In the description, although the battery container 339 is illustrated as the space in which the battery is disposed according to an embodiment, in the space of the battery container 339, the antenna may be disposed, or the antenna and the battery may be disposed together.

For example, on the PCB 333, the circuit configurations used for an electrical driving of the second electronic device 210 may be mounted. For example, the circuit configurations may include at least one of a PCB electrode part 333a, a dome switch 333b, at least one capacitor 333c, a PCB antenna 333d, a PCB battery 333e, a wireless communication interface 333f, or a charging circuitry (not illustrated). The PCB 333 on which the circuit configurations are mounted may be disposed in the designated storage space (e.g., PCB container 337) of the first internal structure 331.

Next, one end of the first internal structure 331 on which the circuit accessories are disposed may be connected to the pen tip part 320. For example, at one end of the first internal structure 331, a hole in which at least a part of the pen tip part 320 can be inserted to be combined with the hole and a mechanical fastening structure may be formed. The pen tip part 320 may include the pen tip 321, the coil 323, and the pen pressure sensor 325, and during the combination, the pen tip 321 may be disposed to be directed in an opposite direction to the direction in which the pen tip part 320 is combined with the first internal structure 331.

Referring to FIG. 4B, the coil 323 according to various embodiments may be electrically connected to the circuit configuration (e.g., PCB electrode part 333a) mounted on the PCB 333.

For example, the coil 323 may be electrically connected to the at least one capacitor 333c and the dome switch 333b mounted on the PCB 333, and may control the resonance frequency of the output signal through the at least one capacitor 333c.

As another example, the coil 323 may be electrically connected to the charging circuitry (not illustrated) mounted on the PCB 333, and may supply charges induced by the coil of the coil 323 to the battery (e.g., the PCB battery 333e mounted on the PCB 333 and/or the battery 334 disposed in the battery container 339) through the charging circuitry. That is, the battery of the second electronic device 210 may be wirelessly charged using the coil 323 and the charging circuitry (not illustrated).

Figure 4C:
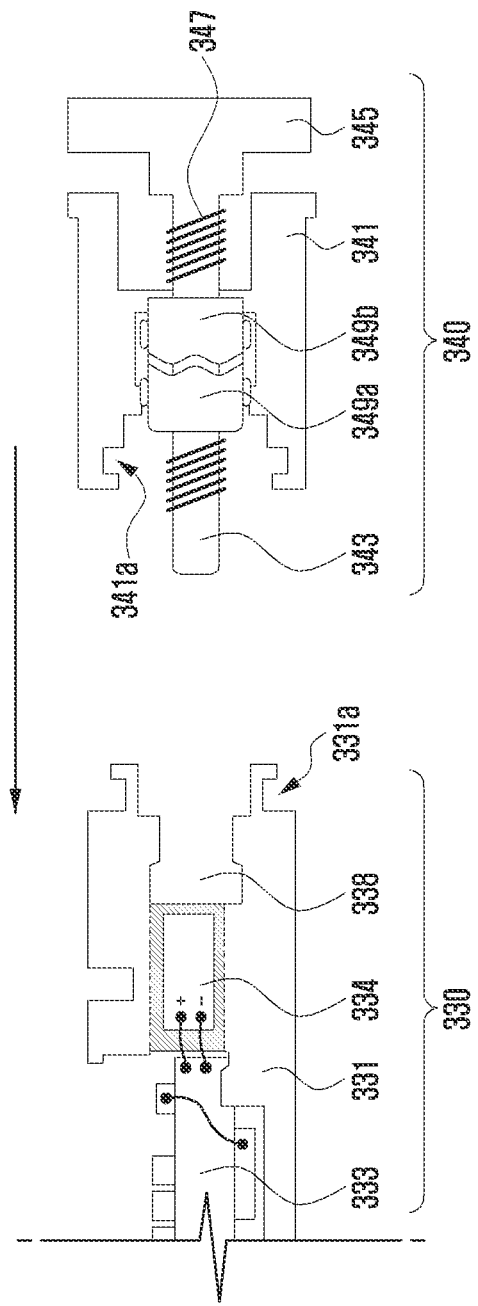

Next, referring to FIG. 4C, the other end of the first internal structure 331 of the circuit board part 330 may be combined with one end of the second internal structure 341 of the ejection member 340.

For example, the other end of the first internal structure 331 and the one end of the second internal structure 341 may include fastening structures 331a and 341a capable of being kinematically interlinked with each other, respectively.

For example, the other end of the first internal structure 331 may further include a shaft hole part 338 to prevent the shaft 343 of the ejection member 340 from coming in contact with the first internal structure 331 when the shaft 343 is rotated in a direction in which the shaft 343 gets closer to the circuit board part 330.

Figure 4D:
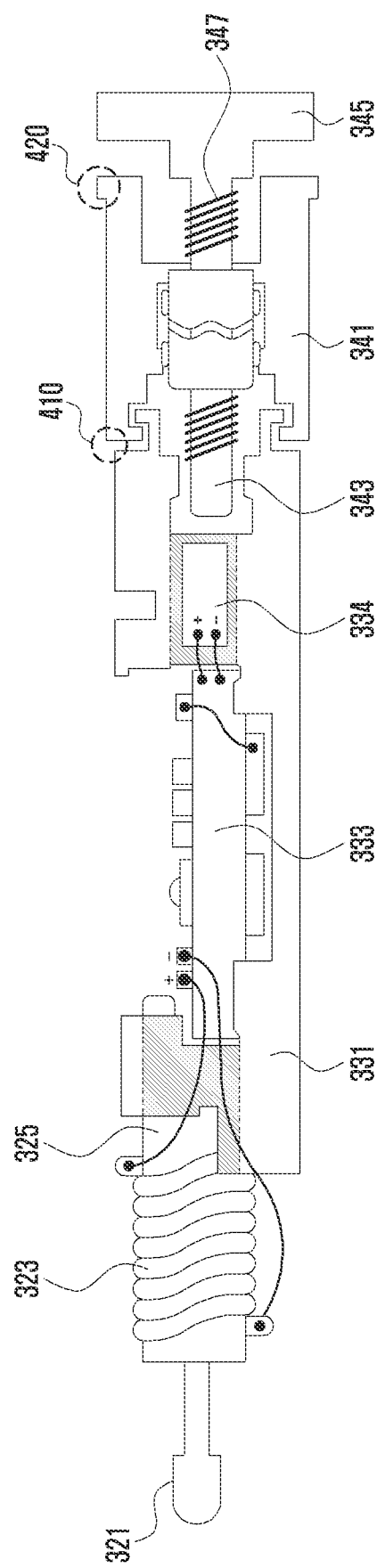

Referring to FIG. 4D, the width of one end of the second internal structure 341 according to various embodiments may be formed to be at least partly larger than the width of the other end of the first internal structure 331. For example, when the circuit board part 330 and the ejection member 340 are combined with each other, the first internal structure 331 and the second internal structure 341 may form a first stepped structure 410 due to the difference between the widths.

As illustrated in FIG. 4D, the second internal structure 341 according to various embodiments may form a second stepped structure 420 by configuring the width of the other end part to be larger at least partly. For example, when the inner assembly including the second internal structure 341 is mounted in the housing 310, the other end part of the second internal structure 341 may be exposed to the outside without being inserted into the housing 310 by the stepped structure.

For example, when the inner assembly including the second internal structure 341 is mounted in the housing 310, the second stepped structure 420 may prevent adhesives for attaching the second internal structure 341 to the housing 310 from leaking out of the housing 310. Further, the first stepped structure 410 and the second stepped structure 420 may serve to guide locations of the first internal structure 331 and the second internal structure 341 of the inner assembly being mounted in the housing 310, respectively.

Figure 4E:
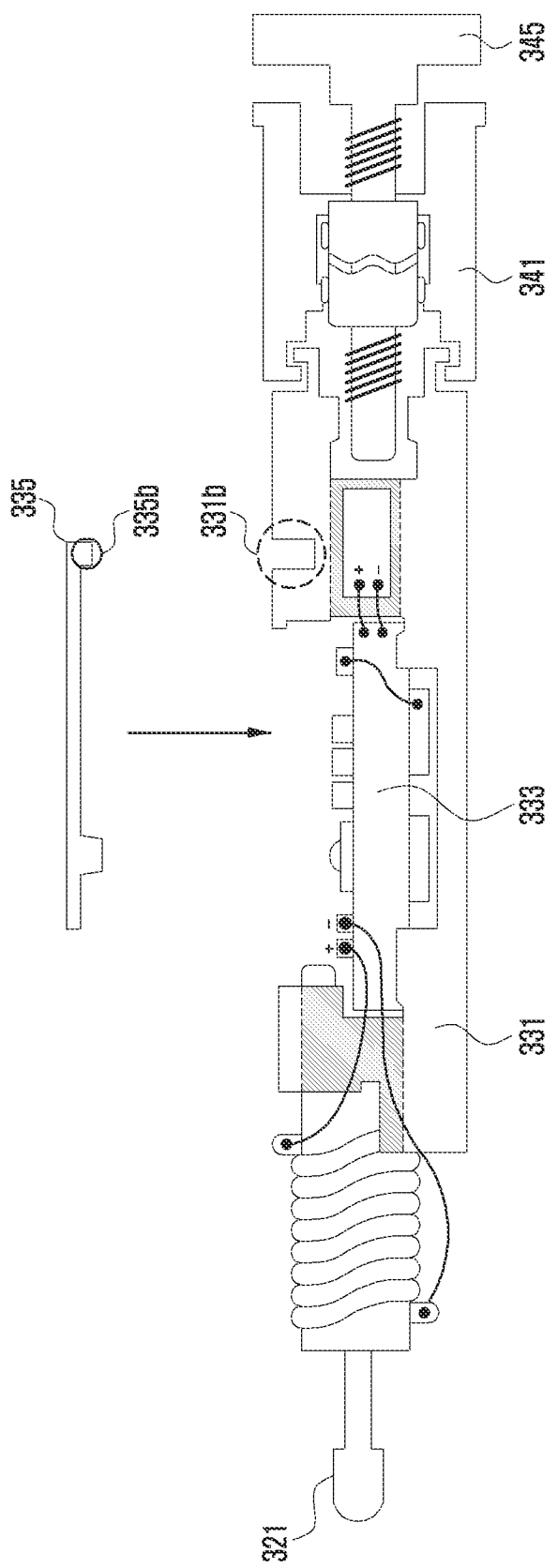

Next, referring to FIG. 4e, after the other end of the first internal structure 331 is combined with the one end of the second internal structure 341, the inner assembly may be formed by combining the support member 335 with the upper end of the first internal structure 331. As illustrated in FIG. 4E, the first internal structure 331 may further include the fastening structure 331b that can be engaged with the support member 335 corresponding to the structure 335b of the support member 335. For example, the support member 335 may support the side button connected from the outside of the housing 310, and may protect the second electronic device 210 against the external impacts together with the housing 310.

Figure 4F:
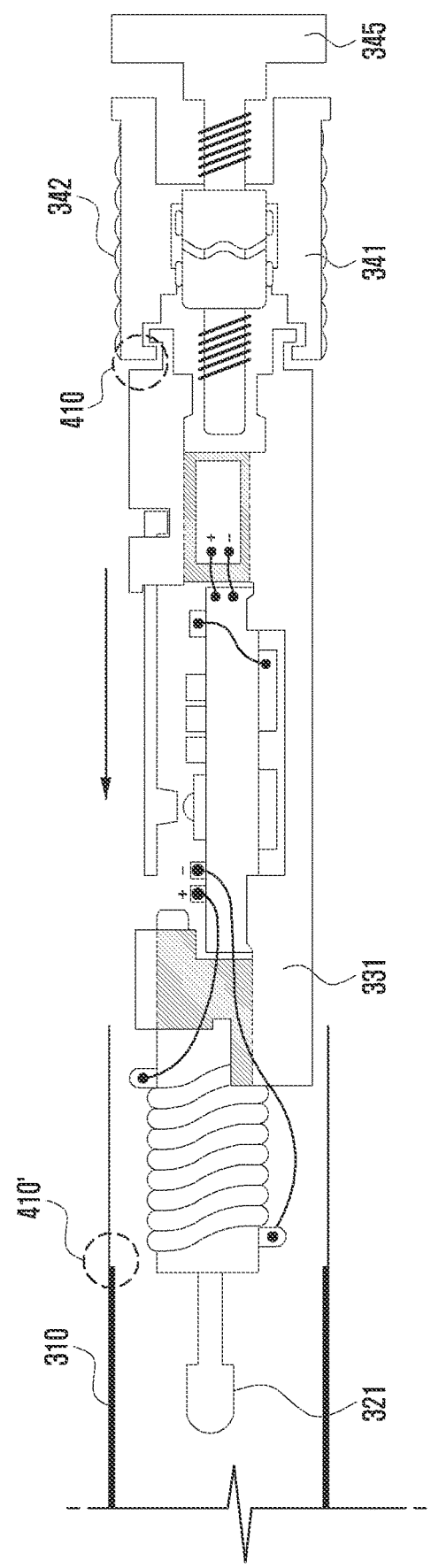

Referring to FIG. 4F, the integrally assembled inner assembly may be inserted into the inside of the housing 310. For example, the inner assembly may be inserted through the second end part having a wider width of the both ends of the housing 310, and in this case, the pen tip 321 of the inner assembly may be inserted in a direction in which the pen tip 321 can be exposed to the outside through the first end part having a narrower width of the both ends of the housing 310.

According to various embodiments, the inner assembly may be inserted into the housing 310 after the adhesives 342 are applied onto at least a partial area of an outside of the second internal structure 341. For example, the adhesives 342 may be inserted into the housing 310 and then is hardened to attach the inner assembly to the housing 310.

According to various embodiments, the inner space of the housing 310 has a structure 410' corresponding to the first stepped structure 410 of the inner assembly, and the width of the partial area of the housing 310 corresponding to the second internal structure 341 may be wider than that of the other area. For example, in the inner space of the housing 310, the width of the first space in which the first internal structure 331 is disposed during insertion of the inner assembly may be configured to be narrower than the width of the second space in which the second internal structure 341 is disposed. Accordingly, when the inner assembly is inserted into the housing 310, the one end of the second internal structure 341 may not be inserted into the housing 310 with more than a predetermined depth by means of the structure 410' of the housing 310.

Figure 4G:
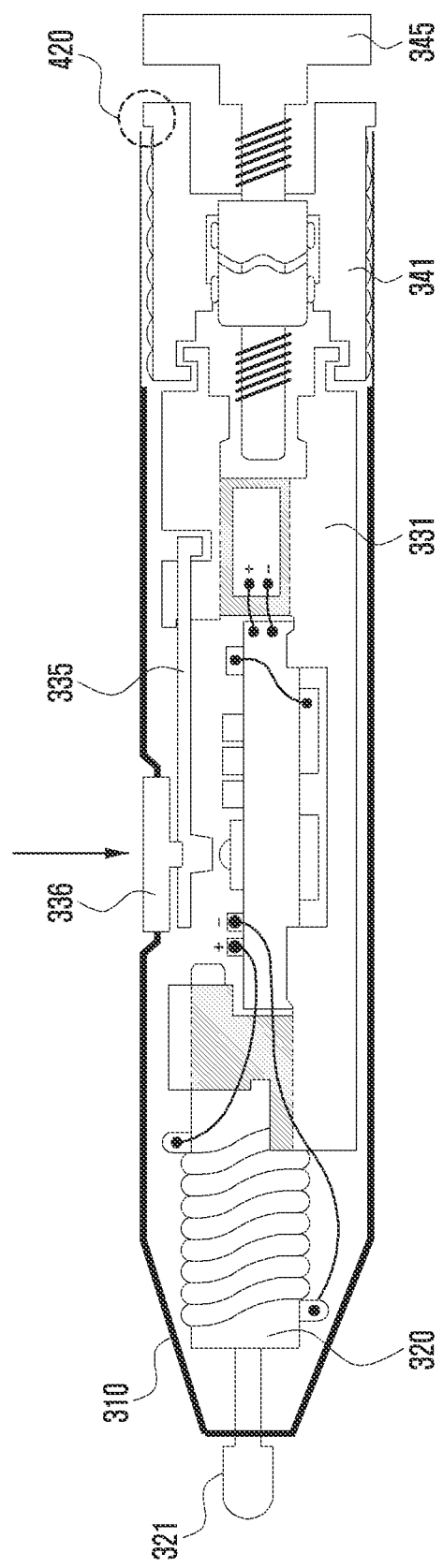

In FIG. 4G, after the inner assembly is inserted into the housing 310, the side button 336 may be mounted on a side button hole part provided on one side of the housing. The side button 336 may press the dome switch mounted on the PCB through the support member 335.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an elongated housing including a first end part having an opening of a first diameter and a second end part having an opening of a second diameter being larger than the first diameter;
a first internal structure including a third end part located between the first end part and the second end part and a fourth end part located between the third end part and the second end part and disposed in a first space of the housing between the first end part and the second end part;
a pen tip part including a dielectric tip extending outwardly from an inside of the housing through the first end part and mounted on the third end part of the first internal structure;
a printed circuit board mounted on the first internal structure between the third end part and the fourth end part;
a second internal structure including a fifth end part engaged with the fourth end part and a sixth end part exposed to an outside of the housing and disposed in a second space of the housing between the second end part and the first space; and
a pressurized structure partially exposed to the outside of the housing and interlinked with the second internal structure through the sixth end part,
wherein at least a part of the second internal structure is formed with a shape and/or a size with which the at least a part of the second internal structure is not inserted into the inside of the housing.

2. The electronic device of claim 1, wherein the second internal structure is formed with a shape and/or a size with which the second internal structure is not inserted into the first space.

3. The electronic device of claim 1, further comprising:
a coil wound on the dielectric tip,
wherein the coil is electrically connected to the printed circuit board.

4. The electronic device of claim 1, further comprising a battery disposed on the first internal structure.

5. The electronic device of claim 4, further comprising:
a coil wound on the dielectric tip; and
a charging circuitry,
wherein the charging circuitry is configured to provide charges induced by the coil to the battery.

6. The electronic device of claim 1, further comprising:
an antenna disposed on the first internal structure; and
a wireless communication interface electrically connected to the antenna,
wherein the electronic device is configured to communicate with an external device using the antenna and the wireless communication interface.

7. The electronic device of claim 1, wherein the first internal structure comprises a space in which an antenna and/or a battery is able to be disposed.

8. The electronic device of claim 1,
wherein the pen tip part is electrically connected to the printed circuit board, and
wherein the pen tip part is configured to differently output a resonance frequency signal based on a degree of pressurization of the dielectric tip.

9. The electronic device of claim 1, further comprising:
a side button provided on one side of the housing,
wherein the electronic device is configured to differently output a resonance frequency signal based on whether to push the side button.

10. An electronic device comprising:
a digital pen including:
an elongated housing including a first end part having an opening of a first diameter and a second end part having an opening of a second diameter being larger than the first diameter,
a first internal structure including a third end part located between the first end part and the second end part and a fourth end part located between the third end part and the second end part and disposed in a first space of the housing between the first end part and the second end part,
a pen tip part including a dielectric tip extending outwardly from an inside of the housing through the first end part and mounted on the third end part of the first internal structure,
a printed circuit board mounted on the first internal structure between the third end part and the fourth end part,
a second internal structure including a fifth end part engaged with the fourth end part and a sixth end part exposed to an outside of the housing and disposed in a second space of the housing between the second end part and the first space, and
a pressurized structure partially exposed to the outside of the housing and engaged with the second internal structure through the sixth end part;
a touchscreen display;
a recess into which the digital pen is able to be inserted; and
a processor,
wherein the digital pen is configured to output a resonance frequency signal in accordance with a user input,
wherein the processor is configured to identify a kind of user input based on an output signal from the digital pen, and
wherein at least a part of the second internal structure is formed with a shape and/or a size with which the at least a part of the second internal structure is not inserted into the inside of the housing.

11. The electronic device of claim 10,
wherein the digital pen further comprises an antenna disposed on the first internal structure and a wireless communication interface electrically connected to the antenna and mounted on the printed circuit board, and
wherein the electronic device is configured to communicate with the processor and/or an external device using the antenna and the wireless communication interface.

12. The electronic device of claim 10, wherein the second internal structure is formed with a shape and/or a size with which the second internal structure is not inserted into the first space of the housing.

13. The electronic device of claim 10,
wherein the digital pen further comprises a coil wound on the dielectric tip, and
wherein the coil is electrically connected to the printed circuit board.

14. The electronic device of claim 11, further comprising a battery disposed on the first internal structure and electrically connected to the printed circuit board.

15. The electronic device of claim 14,
wherein the digital pen further comprises a charging circuitry mounted on the printed circuit board, and
wherein the charging circuitry is configured to provide charges induced by a coil to the battery.

16. The electronic device of claim 10, wherein the first internal structure, the dielectric tip, the printed circuit board, the second internal structure, and the pressurized structure are integrally connected to one another, and are inserted into and combined with the inside of the housing.

17. The electronic device of claim 10, wherein the first internal structure comprises a space in which an antenna and/or a battery is able to be disposed.

18. The electronic device of claim 10,
   wherein the digital pen further comprises a side button provided on one side of the housing, and
   wherein the electronic device is configured to differently output a resonance frequency signal based on whether to push the side button.

\* \* \* \* \*